Dec. 8, 1964     C. E. KRAUS     3,160,029
HYDRODYNAMIC CONVERTER
Filed Oct. 17, 1962
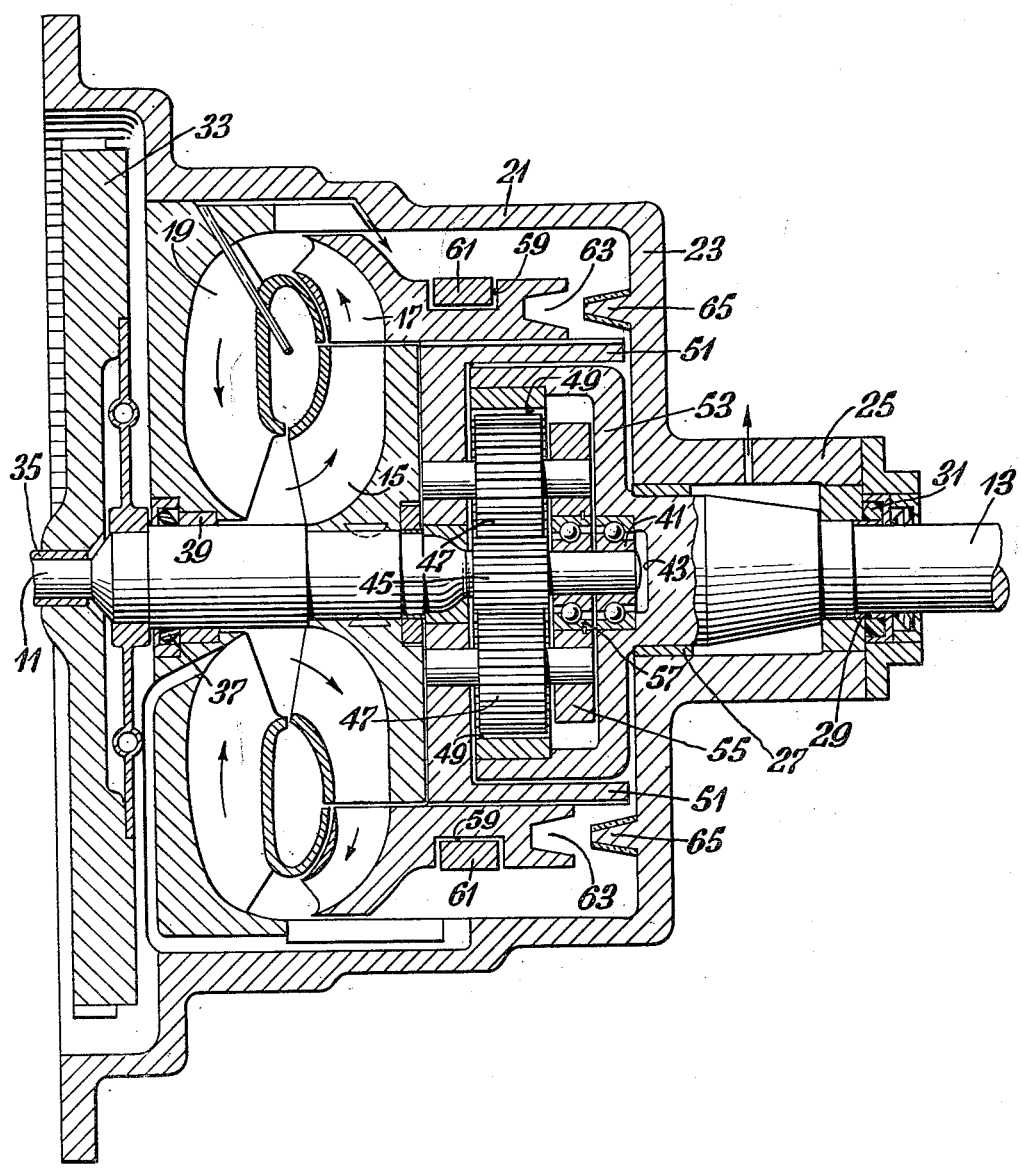

United States Patent Office 3,160,029
Patented Dec. 8, 1964

3,160,029
HYDRODYNAMIC CONVERTER
Charles E. Kraus, Franklin Lakes, N.J., assignor to Excelermatic Inc., a corporation of New York
Filed Oct. 17, 1962, Ser. No. 231,087
5 Claims. (Cl. 74—688)

The present invention relates to a power transmission device and more particularly to a combined fluid driven and gear driven torque converter characterized by its adaptability to simplified operational control and automatic load adjusting capability.

An ever-present problem in the mechanical power art is the transmission of rotational torque from an operating machine's driving component to a still-standing load which is to be driven in a manner characterized by an inital transmssion of low-speed high-torque starting power, smooth acceleration to and through mid-range running speeds, further smooth acceleration to high-speed low-torque overdrive speeds, the facility of facile transition to a neutral or idling condition and the further facility of effective and facile transistion to a reverse drive condition wherein the rotational direction of the driving component does not change. Conventional transmissions of the geared type, fluid drive type or combined geared-fluid drive type to provide these desirable characteristics generally embody numerous complicated cooperating parts and none of the known transmission devices performs all of the above-mentioned desired operations without adaptation to cumbersome and complicated transmission control schemes. Conventional transmission devices, for example, most frequently require involved position and directional shifting of control operating parts, such as levers and the like, to effect at least some of the desired operating conditions. As to transmission control, it can be readily appreciated by persons familiar with the art that the desideratum is unidirectional control, scil., control wherein any of the desired operating conditions can be effected by linearly positioning a single control actuating lever in a position corresponding to the condition selected by an operator.

Accordingly, it is an object of the present invention to provide a unique transmission apparatus continuously operable over a complete output speed range extending from a high-speed forward fluid overdrive, through decreasing forward speeds, through neutral and into a geared reverse drive.

It is a further object of my invention to provide a transmission apparatus controllably variable to produce continuously variable output torque with a constant speed input.

A still further object of this invention is to provide a transmission apparatus which delivers output torque through combined gear and hydraulic means as well as through either gear means or hydraulic means alone.

Another object of the invention is to provide a combined gear and hydraulic transmission which, with a constant input, automatically adjusts the proportion of torque delivered through hydraulic linkage as against gear linkage in accordance with increases and decreases in the driven load.

A still further and important object of my invention is to provide a transmission apparatus continuously operable with a unidirectional control motion over a complete output speed range extending from a high speed forward overdrive, through decreasing forward speeds, through neutral and into a geared reverse drive.

The novel hydraulic and mechanical features and continuously adjustable control provisions of my invention make it widely adaptable to machine tool control and heavy equipment applications as well as to vehicular transport means as a transmission apparatus.

In general, apparatus according to my invention comprises, in combination, a transmission housing adapted to contain a hydraulic fluid and the major components of the apparatus as well as bearing support means for respective input and output shafts; an input shaft extending into said housing; an output shaft extending from said housing; a sun gear affixed concentrically on said input shaft; a ring gear concentrically disposed in subtending relationship to the sun gear and fixedly attached to said output shaft; planet gears disposed in meshed relationship with said sun gear and said ring gear; a planet gear carrier disposed to support said planet gears in meshed relationship with said sun gear and said ring gear and arranged to rotate concentrically about a longitudinal axis of the input shaft; hydraulic impeller means arranged concentrically on said input shaft and affixed thereto; hydraulic stator means arranged in said housing and disposed in hydraulic flow circuit relationship with said impeller means; hydraulic turbine means arranged on said planet carrier, fixed rotatably thereto and arranged to move longitudinally slideably thereon; means for restraining relative rotational motion between the turbine means-planet carrier and the housing; and control means adapted to selectably position the turbine means in hydraulic flow circuit relationship with said impeller means and said stator means and in locked relationship with said means for restraining relative motion of the turbine means-planet carrier and the housing.

With the foregoing features in view, as well as others which will more fully hereinafter appear, the invention will now be described in greater particularity with reference to the appended drawing, which is a cross sectional view taken longitudinally through the central rotational axis of an embodiment of apparatus according to the present invention.

Referring to the drawing, there is shown a driving or input shaft 11, extending toward the left from the apparatus shown to a connection with a driving source such as for example an internal combustion engine (not shown) and a driven or output shaft 13, extending towards the right from the apparatus shown to a connection with a driven load (not shown). A turbine impeller 15 is splined or otherwise affixed to input shaft 11. Arranged in hydraulic circuit with impeller 15 is a rotary movable turbine 17 and a stator 19. Turbine 17 may be selectably moved longitudinally out of the hydraulic circuit from the position shown in the drawing as will be explained in detail hereinafter. Hydraulic fluid is urged through this arrangement in the direction indicated by the flow arrows in the drawing. The stator 19 is fixedly mounted in a housing 21 which encloses the several components of the apparatus. Housing 21 comprises a generally cylindrical hollow main body portion, a radially extending wall portion 23 adjacent the driven shaft end of the apparatus and an end bell 25 which is provided with bearings 27, 29 and a fluid seal 31 for the output shaft 13. The input shaft end of the housing 21 is closed by an end plate 33 which may be bolted or otherwise sealably connected to the housing and which is provided with a bearing 35 and seal 37 for the input shaft's entry point into the housing. Other input shaft bearings 39 and 41 may be provided respectively at the stator 19 location and in a bearing well 43 in the end of the output shaft 13.

A sun gear 45 is splined or otherwise fixedly mounted on input shaft 11 and rotates therewith. Two planet gears 47 disposed to engage sun gear 45 and a ring gear 49, are rotatably mounted on a planet carrier 51 which is subtended by and splined or otherwise attached to a longitudinally extending portion of the turbine 17, so that the carrier and turbine are rotatably locked together but slideable longitudinal movement between them is permitted. The ring gear 49, which engages the planet gears 47 peripherally, is fixedly mounted interior of a driving drum 53 attached to or formed integrally with the output shaft 13. A bearing disc 55, with a bearing 57 adapted to turn on the input shaft, may be provided outboard of the planet gears 47 to support their respective shafts extending from the planet carrier 51. This portion of the apparatus then is seen to form a nesting arrangement extending radially from the sun gear 45 and comprising the planet gears 47, ring gear 49 in the driving drum 53 and a longitudinally extending portion of the planet carrier 51 to which is circumferentially affixed and longitudinally slideably engaged to the subtending portion of the turbine 17.

Turbine 17 is shown in the drawing in one of two ultimate longitudinal positions which it may be made to assume. In the position shown, the blade segments of the turbine are fully in the hydraulic circuit with the impeller 15 and the stator 19. The turbine body is provided with a peripheral recess 59 into which is fitted tines 61 of a control lever which extends through housing 21 to control linkage in a conventional manner. The tines 61 can thus be made to position the turbine 17 as shown or to position it at any other location to the right of that shown along splines or the like on planet carrier 51 to the other ultimate position, wherein a brake recess 63 in the body of turbine 17 is frictionally engaged by a brake shoe 65 which extends longitudinally from the radial wall 23 of housing 21.

Rotation of the input shaft 11 effects rotation in the same direction of the impeller 15 and the sun gear 45, both of which are splined thereto. The operation of the converter may be best understood by initially considering the output shaft 13 at rest, as for instance under a load not yet powered. As the input shaft accelerates from rest, it first passes through a speed range wherein the output shaft remains at rest. In this range, the turbine impeller 15 is at too low a speed to transmit hydraulic torque to the turbine 17. Turbine 17, however, is rotating slowly in the same direction as the input shaft as a function of the gearing, scil. the sun gear drives the planets 47 around itself and the stationary ring gear 49 and the planets are mounted on carrier 51 which is affixed to the turbine. As the input shaft speed increases, the impeller 15 begins to deliver torque through the hydraulic circuit to the turbine 17 which may, due to particular blade ratio selections, be adapted to rotate faster than the impeller. As the speed of the turbine and the planet carrier 51 attached thereto increases, the planet gears 47 will urge the ring gear 51, driving drum 53 and output shaft 13 into rotation in the same direction of rotation as the input shaft, planet carrier and turbine. At the point in this speed range where the input shaft and output shaft are rotating at the same speed, the planet carrier and related parts will also be rotating at this same speed but the planet gears 47 will be stationary about their own respective rotational axes and will merely revolve around the rotating sun gear with no relative gear tooth movement as between the sun, planet and ring gears. At output shaft speeds below this point, greater torque will be transmitted through the gearing than through the hydraulic circuit. At output shaft speeds above this point, greater torque will be transmitted through the hydraulic circuit, carrier and planets than through the sun gear. At speeds in what may be considered an overdrive range, the turbine drives the carrier and planet gears in the manner not only to effect delivery of torque to the ring gear and output shaft, but also to recirculate torque into the sun gear and driving shaft 11.

By appropriate movement of the converter control linkage, the tines 61 may be caused to urge the turbine 17 completely out of the hydraulic circuit, placing the converter in operating neutral. The control movement between a condition of full turbine engagement in the hydraulic circuit and the condition of operating neutral constitutes an output speed-torque adjustment range for a constant input. Further movement of the control linkage will cause brake recess 63 to impinge on brake shoe 65 and lock the turbine-planet carrier against rotation. In this condition, with the planet gear rotational axes fixed in space, the operation of the sun gear, turning in the same initial direction, will effect opposite rotation of the ring gear 49, and yield a geared reverse drive of the output shaft 13.

From the foregoing description and the drawing, it can be appreciated that the present invention offers a significant advance in the power transmission art in providing apparatus which is easily controlled by a unidirectional control movement over a full operational speed range extending from a hydromechanical overdrive, through neutral and into a geared reverse. Apparatus according to my invention can be operated with either a constant delivery or a variable input with the above noted control features obtaining.

In the light of my disclosure, persons skilled in the mechanical arts will also appreciate that the present invention also provides a unique hydraulic transmission which is not only controllably variable to produce continuously variable output torque with a constant speed input, but in addition which, with a constant input, automatically adjusts the proportion of torque delivered through hydraulic linkage as against gear linkage in accordance with increases and decreases in the driven load. It is conceivable, in the light of this disclosure, that alternative structures within the spirit of my invention will suggest themselves to persons familiar with the mechanical arts. The foregoing disclosure, therefore, has been given for clearness of understanding only, and no unnecessary limitations should be understood therefrom.

What is claimed is:

1. In a hydrodynamic torque converter which includes a housing adapted to contain a hydraulic fluid, an input shaft extending into said housing and an output shaft extending from said housing, the combination comprising a sun gear arranged concentrically on said input shaft and affixed thereto; a ring gear concentrically disposed in subtending relationship to said sun gear and fixedly attached to said output shaft; planet gears meshed with said sun gear and said ring gear; a planet gear carrier disposed to support said planet gears in meshed relationship with said sun gear and said ring gear and arranged to rotate concentrically about a longitudinal axis of the input shaft; a hydraulic impeller arranged concentrically on said input shaft and affixed thereto; a hydraulic stator arranged in said housing and disposed in hydraulic flow circuit relationship with said impeller; a hydraulic turbine mounted concentrically on said planet carrier, fixed rotatably and longitudinally slideably engaged thereto and disposed for selectable introduction into and removal from hydraulic flow circuit relationship with said impeller and said stator.

2. A hydrodynamic torque converter comprising, in combination, a housing adapted to contain a hydraulic fluid; an input shaft extending into said housing; an output shaft extending from said housing; a sun gear arranged concentrically on said input shaft and affixed thereto; a ring gear concentrically disposed in subtending relationship to said sun gear and fixedly attached to said output shaft; planet gears meshed with said sun gear and said ring gear; planet gear carrier means disposed to support said planet gears in meshed relationship with said sun gear and said ring gear and arranged to rotate concentrically about a longitudinal axis of the input shaft; hydraulic impeller means arranged concentrically on said input shaft and affixed thereto; hydraulic stator means arranged in said housing and disposed in hydraulic flow circuit relationship with said impeller means; hydraulic turbine means mounted concentrically on said planet carrier, fixed rotatably thereto and arranged to move longitudinally slideably thereon; and control means adapted to selectably position said turbine means in hydraulic full flow circuit relationship, partial flow circuit relationship and out of flow circuit relationship with respect to said impeller means and said stator means.

3. Apparatus according to claim 1 in combination with means for restraining rotational motion of said turbine means.

4. A hydraulic-mechanical torque converter comprising, in combination, a housing adapted to contain hydraulic fluid; a rotatable input shaft extending into said housing; a rotatable output shaft in longitudinal alignment with said input shaft and extending from said housing; a sun gear arranged concentrically on said input shaft and affixed thereto; planet gears arranged in meshed orbital relationship with said sun gear; planet gear carrier means having longitudinally extending planet gear shafts arranged to rotatably support said planet gears, said planet gear carrier means being rotatably supported on said input shaft; a ring gear arranged in meshed orbital relationship with said planet gears; driving drum means subtending and peripherally attached to said ring gear and connecting fixedly with said output shaft; hydraulic impeller means arranged concentrically on said input shaft and rotatably affixed thereto; hydraulic stator means interior of said housing and disposed in hydraulic flow circuit relationship with said impeller; hydraulic turbine means arranged concentrically on said planet gear carrier means, fixed rotatably thereto and adapted to slide longitudinally thereon between first and second limiting positions brake means adapted to lockably restrain the turbine means against rotational movement when said turbine means is in said second limiting position; and control means adapted to selectably move said turbine means to said second limiting position and to said first limiting position wherein which first limiting position said turbine means is disposed in hydraulic full flow circuit relationship with said impeller means and said stator means.

5. A hydrodynamic torque converter comprising, in combination, a housing adapted to contain a hydraulic fluid; an input shaft extending into said housing; an output shaft extending from said housing; a sun gear arranged concentrically on said input shaft and affixed thereto; a ring gear concentrically disposed in subtending relationship to said sun gear and fixedly attached to said output shaft; planet gears meshed with said sun gear and said ring gear; a planet gear carrier disposed to support said planet gears in meshed relationship with said sun gear and said ring gear and arranged to rotate concentrically about a longitudinal axis of the input shaft; a vaned hydraulic impeller arranged concentrically on said input shaft and affixed thereto; a vaned hydraulic stator arranged in said housing and disposed in hydraulic flow circuit relationship with said impeller; a vaned hydraulic turbine mounted concentrically on said planet carrier, fixed rotatably thereto and arranged to move longitudinally slideably thereon; brake means adapted to lock the planet carrier and the turbine against rotation; and control means adapted to selectably position said turbine in hydraulic flow circuit relationship with said impeller and said stator and in locked relationship with said brake means.

References Cited by the Examiner
UNITED STATES PATENTS 2,384,841   9/45   Lang et al. _____ 60—54
3,099,171   7/63   Ivanchich _____ 74—688

DON A. WAITE, *Primary Examiner.*